US010240685B2

(12) United States Patent
Ramos

(10) Patent No.: US 10,240,685 B2
(45) Date of Patent: Mar. 26, 2019

(54) SECURE VALVE ACCESS

(71) Applicant: Gilbert C. Ramos, Missioin, TX (US)

(72) Inventor: Gilbert C. Ramos, Missioin, TX (US)

( * ) Notice: Subject to any disclaimer, the term of this patent is extended or adjusted under 35 U.S.C. 154(b) by 0 days.

(21) Appl. No.: 15/658,675

(22) Filed: Jul. 25, 2017

(65) Prior Publication Data

US 2018/0038508 A1    Feb. 8, 2018

Related U.S. Application Data

(60) Provisional application No. 62/494,292, filed on Aug. 3, 2016.

(51) Int. Cl.
F16K 35/00 (2006.01)
F16K 31/60 (2006.01)

(52) U.S. Cl.
CPC .............. *F16K 35/00* (2013.01); *F16K 31/60* (2013.01)

(58) Field of Classification Search
CPC ........... F16K 31/60; F16K 35/00; F16K 35/06
USPC ......... 137/377; 251/89, 90, 95–100; 74/547, 74/551.3
See application file for complete search history.

(56) References Cited

U.S. PATENT DOCUMENTS

| 209,181 | A |   | 11/1878 | Miller |   |
|---|---|---|---|---|---|
| 734,680 | A | * | 7/1903 | Dodge | B29C 45/38 425/311 |
| 1,215,958 | A |   | 2/1917 | Miller |   |
| 1,741,983 | A | * | 12/1929 | Ellberg | F16K 41/16 251/184 |
| 1,855,414 | A |   | 4/1932 | Otten |   |
| 2,091,618 | A | * | 8/1937 | Szabo | F16K 3/24 137/556 |
| 3,384,339 | A |   | 5/1968 | Cornell |   |
| 3,504,888 | A |   | 4/1970 | Bates |   |
| 3,556,131 | A |   | 1/1971 | Diaz |   |
| 3,840,041 | A | * | 10/1974 | McMurray | E03B 9/02 137/296 |
| 4,363,465 | A | * | 12/1982 | Morrill | F16K 41/04 137/246.12 |
| 4,429,711 | A | * | 2/1984 | Schomer | F16K 35/14 137/385 |
| 4,480,513 | A |   | 11/1984 | McCauley |   |
| 4,484,595 | A |   | 11/1984 | Vanek |   |
| 4,566,481 | A |   | 1/1986 | Leopold |   |
| 4,662,196 | A |   | 5/1987 | Michon |   |
| 4,716,922 | A | * | 1/1988 | Camp | E03B 9/02 137/296 |
| 5,071,300 | A |   | 1/1991 | McCauley |   |
| 5,664,447 | A |   | 1/1997 | Neeley |   |
| 5,741,003 | A | * | 4/1998 | Segien, Jr. | F16K 31/60 16/441 |

(Continued)

*Primary Examiner* — Kevin F Murphy
*Assistant Examiner* — Jonathan J Waddy
(74) *Attorney, Agent, or Firm* — G. Turner Moller

(57) ABSTRACT

A secure valve access system includes a cover mounted over the valve stem of a valve. The cover is attached to a support which is mounted on the valve so the cover cannot be removed. Fasteners extend through the support and are selectively jammed against a wrench flat thereby providing a torque transmitting connection between the cover and a valve operator. Retraction of the fasteners breaks the torque transmitting connection allowing the cover to free wheel thereby preventing unauthorized operation of the valve. Rotation of the fasteners is done by an unusual drive socket.

18 Claims, 3 Drawing Sheets

(56) References Cited

U.S. PATENT DOCUMENTS

| | | | |
|---|---|---|---|
| 5,996,613 A | 12/1999 | Bertolotti | |
| 6,038,893 A | 3/2000 | Neeley | |
| 6,089,253 A | 7/2000 | Stehling | |
| 6,176,255 B1 | 1/2001 | Robinson | |
| 6,205,826 B1 | 3/2001 | Neeley | |
| 6,276,662 B1 | 8/2001 | Bugatti | |
| 6,543,467 B2 | 4/2003 | Robinson | |
| 6,584,649 B1 * | 7/2003 | Lichtenberg | F16K 31/607 16/441 |
| 6,860,177 B2 | 3/2005 | Bugatti | |
| 8,074,960 B2 | 12/2011 | Milbeck | |
| 8,561,635 B2 | 11/2013 | Pilarczyk | |
| 8,905,060 B2 | 12/2014 | Schlesinger | |
| 2003/0217571 A1 | 11/2003 | Tumeau | |
| 2004/0103942 A1 | 6/2004 | Brown | |
| 2012/0126156 A1 | 5/2012 | Bennett | |

\* cited by examiner

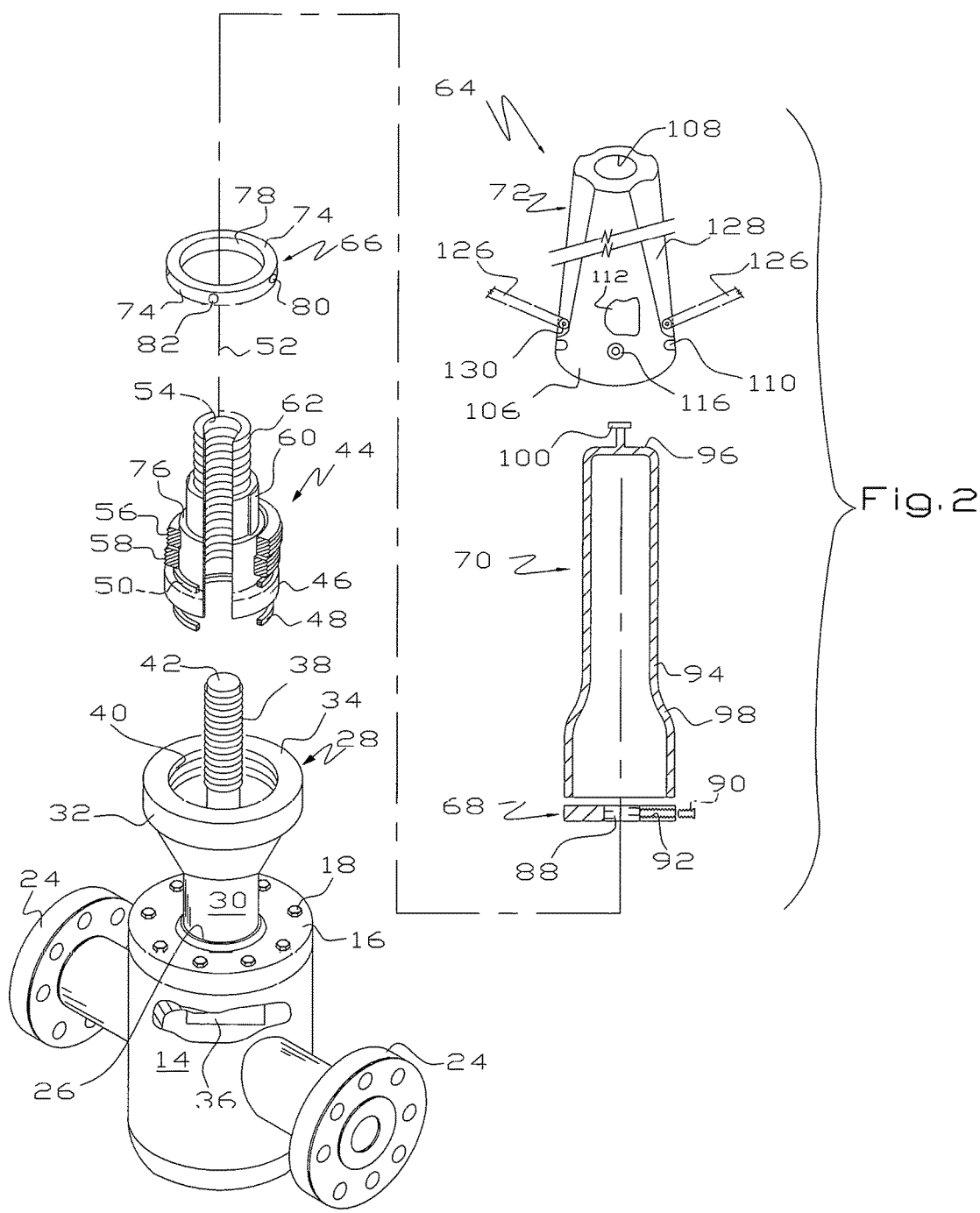

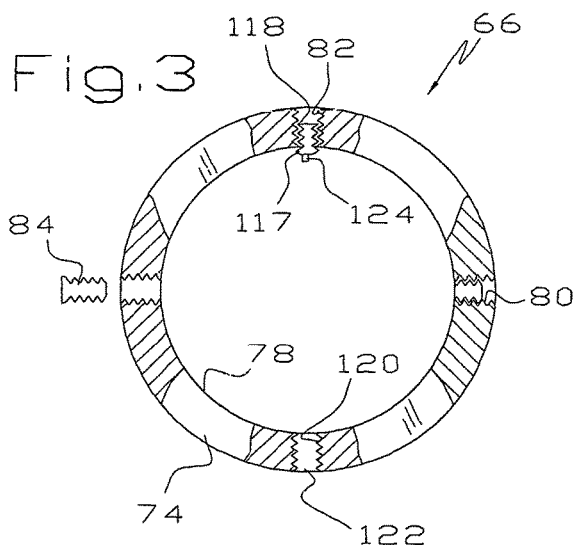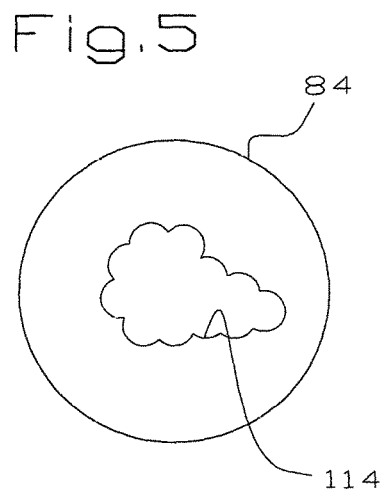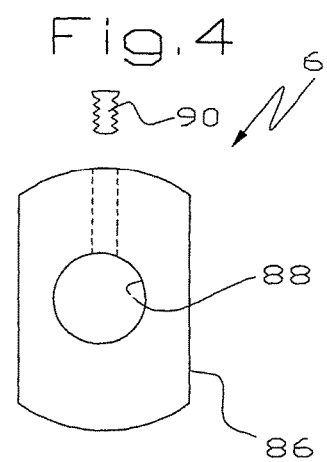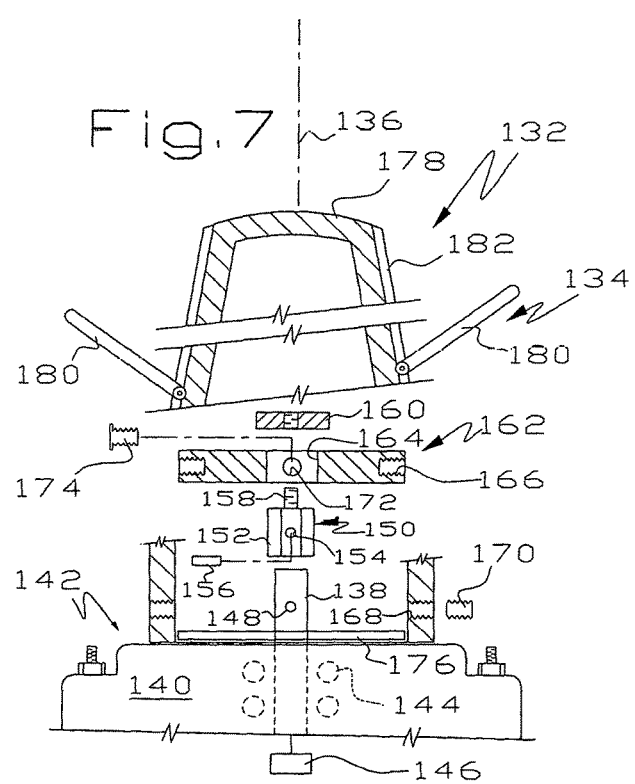

SECURE VALVE ACCESS

This invention relates to a technique for preventing access to a valve operator to prevent unauthorized opening or closing of a valve. This application is based on, or partially based on, U.S. Provisional Patent Application Ser. No. 62/494,292 filed Aug. 3, 2016, priority of which is claimed.

BACKGROUND OF THE INVENTION

Valves are widely used in the oil and gas industry, and others, to control the flow of liquids and gases through pipelines. A typical valve includes a valve element, such as a valve plug, gate or valve ball, located inside a housing to control flow through the housing. A valve stem from the valve body exits through the housing to an exterior of the valve and is normally equipped with a handle so the valve stem can be manipulated thereby opening or closing the valve. The valve housing opens through suitable connections, such as flanges, pipe ends or the like, which are joined to a pipeline or other conduit through which gas or liquid flows.

There are some situations where it is desirable to prevent unauthorized opening or closing of a valve. The normal solution to this problem is to remove the valve handle or to place a lock out device on the valve handle. A typical situation where this is desirable is to protect a valve or equipment adjacent a valve from being stolen.

There are a variety of approaches to prevent an unauthorized person from opening or closing a valve. The earliest approach is to tie a valve wheel with a chain and padlock so it cannot be moved. More sophisticated approaches have surfaced. One such approach is to mount a rotatable cover over the valve stem which, in a one position, free wheels so no torque is applied to the valve stem upon rotation of the cover. An authorized person has a specially adapted key or wrench to selectively couple the rotatable cover to the valve stem so torque applied to the cover turns the valve stem and thereby operates the valve. It is to this class of devices that this invention most nearly relates.

Some disclosures of interest are found in U.S. Pat. Nos. 1,215,958; 4,484,595; 4,662,196; 5,071,300; 5,664,447; 5,996,613; 6,038,893; 6,089,253; 6,176,255; 6,205,826; 6,276,662; 6,543,467; 6,860,177 and 8,074,960 along with U.S. Printed Patent Applications 20030217571 and 20120126156.

SUMMARY OF THE INVENTION

As disclosed herein, a conventional valve is modified by removing the valve handle or hand wheel and installing a cover such as a bell or dome which is supported on the valve and mounted for rotation about the valve stem without rotating the valve stem and thereby not manipulating the valve body. To actuate the valve, fasteners on the bell are temporarily positioned by a specially made tool to advance a threaded fastener into engagement with the yoke to transmit rotation of the bell into rotation of the valve stem thereby allowing authorized opening or closing of the valve.

It is an object of this invention to provide an improved technique to prevent unauthorized opening or closing of a valve.

Another object of this invention is to provide a bell or dome on a valve over a valve stem so the bell can rotate without manipulating the valve element and thereby prevent unauthorized opening or closing of the valve.

Other objects and advantages of this invention will become more fully apparent as this description proceeds, reference being made to the accompany drawings.

BRIEF DESCRIPTION OF THE DRAWINGS

FIG. 2 is an exploded partly isometric and partly cross-sectioned conventional valve equipped with a cover to prevent access to a valve stem of the valve;

FIG. 3 is a top view of a support to mount the cover of FIGS. 1 and 2 for rotation on the valve and to retain the cover on the valve, certain parts being broken away to show interior sections of the support;

FIG. 4 is a top view of a nut used to captivate the support of FIG. 3 to the valve of FIGS. 1 and 2;

FIG. 5 is a view of an end of a screw used to attach a cover to the valve stem;

FIG. 7 is a partially exploded cross-sectional view of a secure access assembly in conjunction with another type valve.

DETAILED DESCRIPTION OF THE INVENTION

Figure 1:
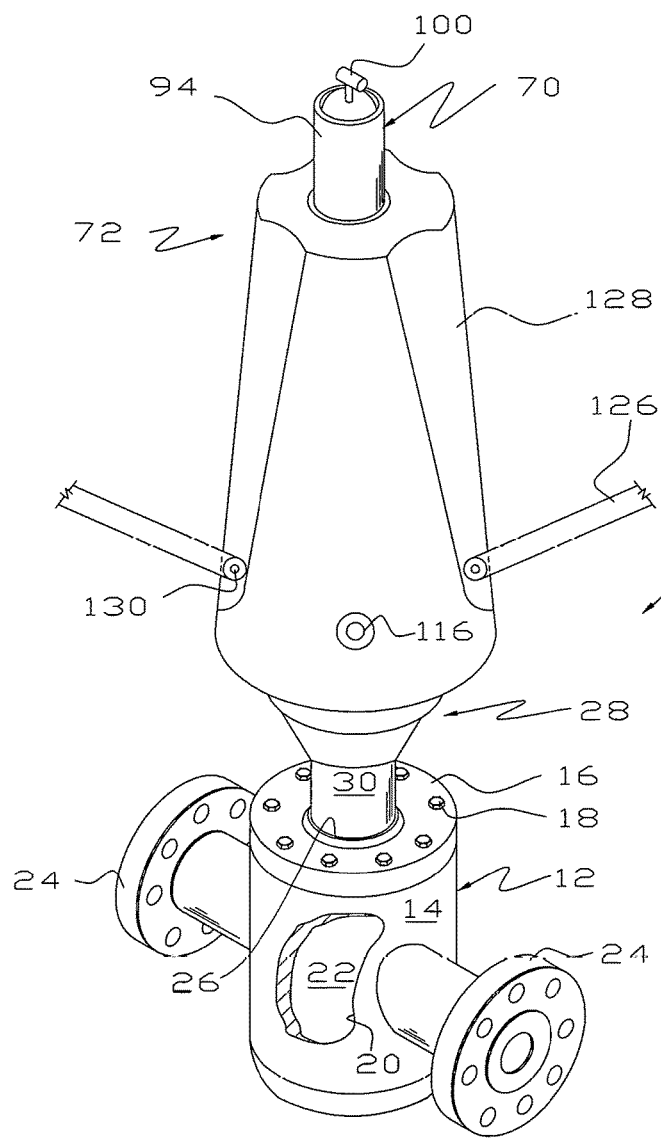
FIG. 1 is an isometric view of a valve equipped with an access assembly of this invention.

Referring to FIGS. 1-5, a conventional valve 10 may include a valve housing 12 having a main housing body 14 and a top 16 secured to the main housing body 14 by suitable threaded fasteners 18. Removing the top 16 exposes a cavity 20 having a valve element or body 22 such as a gate, plug or ball therein. Suitable seals (not shown) are provided to cooperate with the valve body 22 to control flow through the valve 10 and prevent leakage as is well known in the art. The valve housing 12 connects to suitable piping (not shown) by connections 24 which are illustrated as flanges but which may be of any suitable type. Extending outwardly from the valve housing 12 through an opening 26 is a stationary bonnet 28 which may have a cylindrical lower end 30 affixed to the housing body 14 in any suitable manner and an enlarged bearing housing 32 providing a fiat upwardly facing surface 34. A bearing 36 in the housing 14 mounts a valve stem 38 for rotation. In gate valves, there is a pivotal connection (not shown) between the valve stem 38 and the gate body 22 allowing rotation of the valve stem 38 and linear movement of the gate body 22. The threaded valve stem 38 extends upwardly through a threaded cavity 40 in the bonnet 28 and includes an upper stem end 42. A yoke 44 is captivated in the threaded cavity 40 on the upper end of the bonnet 28. In a modern type of gate valve, the valve stem 38 rotates inside a stationary yoke 44 so the valve stem 38 moves up and down. In ball or plug valves, the valve stem 38 rotates less than a full revolution, usually 90°, to rotate valve ball (not shown) or plug (not shown) from a position allowing fluid flow between the connections 24 and a position blocking fluid flow between the connections 24.

A conventional yoke 44 is of somewhat complex design and includes a lower flange 46 having a lower bearing 48 and upper bearing 50 mounting the yoke 44 for rotation about an axis 52. A threaded passage 54 receives the valve stem 38. First and second exteriorally threaded retaining rings 56, 58 thread into the threaded cavity 40 and thereby retain the yoke 44 in the bonnet 28. The yoke 44 also includes an octagon or series of wrench flats 60 to which is normally attached a socket of a handle or hand wheel (not shown). It will accordingly be seen that the valve 10 is illustrated of a type where rotation of the yoke 44 by a hand wheel (not shown) causes the valve stem 38 to rise or descend thereby moving the valve body 22 and opening or closing the valve 10. It will be equally apparent that the secure valve assembly disclosed hereinafter is capable of connection to any type or size of valves, in particular all sizes of gate valves, plug valves or ball valves.

A threaded section 62 above the wrench flats 60 normally receives a thread protector (not shown) on a conventional valve. To modify an existing conventional valve 10 to incorporate the secure valve access assembly of this invention, it is necessary to remove the pre-existing thread protector (not shown) and hand wheel or handle (not shown). Those skilled in the art will recognize the valve 10, as heretofore described, as being typical of conventional gate valves, reference being made to publications of Cameron Corporation, ABB, General Electric or Gray Manufacturing Company for a more complete description of modern gate valves and, more particularly, a more complete description of a yoke described above.

Typical valves which may be equipped with a valve access assembly 64 may include plug valves, gate valves, ball valves and others which may be manipulated by multiple turns of the valve stem 38 or by a quarter turn. Some types of valves usable with this invention include those shown in U.S. Pat. Nos. 2,069,013; 3,504,888 and 4,776,566, the disclosures of which are incorporated herein by reference.

A secure valve access assembly 64 may comprise, as major components, a support 66, a connector or nut 68, a thread protector 70 and a cover such as a dome or bell 72 and is configured to allow rotation of the bell 72 without rotating the valve stem 38 and thereby prevent actuation of the valve 10. Consequently, merely turning the bell 72 is ineffective to manipulate the valve stem 38 and is accordingly ineffective to open or close the valve 10. As will become more apparent hereinafter, in some embodiments, a component of the assembly 64 may be eliminated and still retain the overall function of the assembly 64.

A major function of the support 66 is to retain the bell 72 on the valve 10, i.e. prevent upward movement of the bell 72 relative to the valve 10, in order to prevent unauthorized removal of the bell 72 and prevent unauthorized access to the valve stem 38. Another function of the support 66 may be to transmit the load of the nut 68, thread protector 70 and bell 72. Although the support 66 is illustrated in the form of a plate, it will be evident it may be of any suitable shape.

The support 66 may be a metal piece 74 of circular or other configuration and may be positioned on any stable upwardly facing surface of the valve 10, such as the flat upper surface 34 of the bonnet 28 or on the lip or flat upper surface 76 of the of the octagon or wrench flats 60. In some embodiments, the lip 76 is above the surface 34 in which event the load of the cover 72 may be wholly supported on the lip 76. In other embodiments, the lip 76 may be below the surface 34 in which event the load of the cover may be supported wholly on the surface 34. The support plate 66 accordingly provides an opening 78 passing over the valve stem 38, a first set of passages 80 and a second set of through passages 82 as shown best by a comparison of FIGS. 2 and 3. The passages 80 may be blind passages terminating short of the opening 78 and receive fasteners 84 to secure the support plate 66 to the dome 72 as explained more fully hereinafter.

The support plate 66 may be captivated to the yoke 44 by the nut 68 which may or may not be fixed to the plate 66. Although the nut 68 may be of any suitable configuration, such as a conventional polygonal yoke, it may be preferred that the nut 68 be basically round with only two wrench flats 86 as shown in FIG. 4. The nut 68 includes a central opening 88 having threads to mate with the threaded section 62 of the yoke 44 and thereby clamp the support plate 66 to the flat upper surface 76 of the octagon or wrench flats 60. A set screw 90 may be used to pass through a threaded passage 92 and thereby jam the nut 68 onto the yoke 44 and thereby assure that the support plate 66 remains captive to the yoke 44. In the event the yoke 44 is of somewhat different dimensions parallel to the axis 52, suitable shims (not shown) may be placed under the support 66 to appropriately position the support 66 and/or the nut 68. It will be apparent the support plate 66 may be directly jammed to the valve stem 38 by a connection such as a set screw similar to the set screw 90.

If the valve stem 38 of a particular valve 10 is short enough to be wholly contained inside the bell 72, the thread protector 70 is not required. If the valve stem 38 is so long as to project out of the end of the bell 72, a major function of the thread protector 70 is to prevent, or attempt to prevent, an authorized user from putting a pipe wrench (not shown) or other suitable tool onto the valve stem 38 adjacent the upper end 42 and thereby have the capability of turning the valve stem 38. In some embodiments, the thread protector 70 may be tapered. The thread protector 70 may be free to rotate relative to the valve stem 38 so that rotation of the thread protector 70 does not rotate the valve stem 38.

The thread protector 70 may comprise a hollow tubular body 34 having a closed upper end 96 and a flared lower open end 98 which may be supported by the nut 68 or the support plate 66. An upper end of the body 94 may be tapered to reduce the ability of a pipe wrench to grasp the body 94. The tubular body 94 may be sufficiently long to extend through the dome or bell 72 and may include a grease zert 100 as shown best in FIG. 1.

As shown best by a comparison of FIGS. 1, 2 and 5, the dome or bell 72 may include a body 106 of metal or other high strength material having a central passage 108 to receive the thread protector 70. The body 106 may preferably be tapered to reduce the bite of a pipe wrench on the body 106 to minimize the success of someone trying to prise off the body 106 with a pipe wrench.

If the valve stem 38 is overly long and the cover 72 is not tall enough, a central passage 108 may be provided so the upper end 96 of the thread protector 70 may extend upwardly through the passage 108 and thereby be exposed above the bell 72. This allows a one size thread protector 70 to accommodate valve stems 38 of considerably different length thereby reducing the number of variations needed to service valves of many different manufacturers. Thus, the thread protector 70 may be supported on the nut 68, on the upper valve stew end 42 or any other suitable stable location on the valve 10. Because the thread protector 70 is not load bearing, no unusual wear will be imparted to the valve stem 38.

The dome or bell 72 may provide a first series of threaded passages 110 opening through an exterior of the body 106 and into the enlarged lower end of the interior 112 of the cover 72. The passages 110 may be recessed or countersunk into the bell 72 to make it more difficult to determine the handedness of the threads, the size of the threads, the pitch of the threads, the shape of the wrench drive and the like. The threaded fasteners 84 may extend through the passages 110 and into the passages 80 of the support plate 66 to secure the bell 72 to the support plate 66 and thereby secure the bell 72 to the yoke 44. The threads in the passages 80 and/or in the passages 110 and on the fasteners 84 may provide suitable approaches to make it difficult for some unauthorized person to make a tool to unthread the fasteners 84. To this end, the threads in the passages 80 and/or the passages 110 and the fasteners 84 may left or right handed, odd sized, at an odd pitch or with an unusual drive socket 114 (FIG. 5) making it difficult for some unauthorized person to make a tool to unthread the fasteners 84. In normal use, the fasteners 84 are embedded in the countersunk openings 110 to make it impossible for an authorized person to measure the threads between the fasteners 84 and the passages 80, 110 and thereby determine the handedness of threads in the passages 80, 110. It will be apparent that the fasteners 84 extend across the joint line between the cover 72 and the support 66 thereby connecting them together.

The dome or bell 72 may provide a second series of threaded or unthreaded passages 116 opening through an exterior of the body 106 and into the enlarged lower end of the interior of the cover 72. The passages 116 may be coplanar with the openings 110 or may be offset. The passages 116 align with the passages 82 of the support plate 66. In a normal position of the valve 10, a series of fasteners 117 do not extend sufficiently through the passages 82 to engage the wrench flats 60 of the yoke 44. Thus, in a normal position of the valve 10, the bell 72 rotates freely on the upper surface 76 of the yoke 44 or on the flat surface 34 of the bonnet 28 and does not impart torque to the yoke 44 or to the valve stem 38. In this condition, the valve 10 cannot be opened or closed. The fasteners 117 have an unusual drive socket, which may be identical or different than the drive socket 114 shown in FIG. 5.

The fasteners 117 may be wholly enclosed inside the passages 82 as shown in FIG. 3 so the driven end 118 cannot be seen or accurately measured by an unauthorized person attempting to duplicate the tool used to drive the fasteners 117. In addition, the passages 82 may be threaded only on its inner ends 120 leaving an outer end 122 unthreaded to make it difficult for an unauthorized person to measure the size, pitch and handedness of the threads between the passages 80 and the fasteners 117. It may sound superfluous to make it difficult to measure the size, pitch or handedness of the threads between the passages 80 and the fasteners 117 but one tactic, which my or may not be preferred, is to completely remove the fasteners 117 and leave an unauthorized user with the task of figuring out the details of the threads in the passages 82.

When it is desired to open or close the valve 10, the fasteners 117 are advanced sufficiently so the reduced ends 124 engage the wrench flats 60 on the yoke 44 and thereby transfer torque from the bell 72 to the yoke 44 and thereby to the valve stem 38 causing the valve body 22 to be moved between open and closed positions. The reduced ends 124 provide sufficient bearing capacity to rotate the yoke 44 and prevent threads on the fasteners 117 from being damaged which would prevent them from being retracted through the threaded passages 82.

The fasteners 117 and mating threads in the passages 82 are accordingly designed so it is difficult or awkward to advance the fasteners 117 and may use the same approaches used on the fasteners 84.

The bell 72 may include handles 126 to rotate the bell 72 and thereby rotate the yoke 44 and the valve stem 38 when it is desired to open or close the valve 10. To this end, the bell 72 may include grooves or recesses 128 to receive handles 126 which may be pivoted to the bell 72 in any suitable manner, as by pins 130.

Assembly and operation of the access assembly 64 should now be apparent. With the thread protector (not shown) and hand wheel (not shown) of the conventional valve 10 removed, the support plate 66 is passed over the valve stem 38 until it is supported on the exposed upper surface 34 of the yoke 44, the lip 76, the upper retaining ring 56 or any other suitable vertical surface inside the valve 10. The nut 68 is then passed over the valve stem 38 and threaded onto the section 62 of the yoke 44 and jammed in place by the set screw 90. This captivates or clamps the support plate 66 onto the yoke 44 and provides a sturdy technique to prevent upward movement of the bell 72.

The thread protector 70 is then passed over the valve stem 38 and comes to rest either on the nut 68 or on the top 42 of the valve stem 38. The bell 72 is then slipped over the thread protector 70 so the passages 110 align with the passages 80. The fasteners 84 may then be threaded into the passages 80 thereby preventing upward movement of the bell 72 relative to the yoke 44. With the fasteners 117 retracted so they do not engage the wrench flats 60 of the yoke 44, any attempt to open or close the valve 10 by rotating the bell 72 simply rotates the bell 72 about the axis 52 without rotating the yoke 44 and thus not rotating the valve stem 38 leaving the valve 10 in its previous position, i.e. either open or closed.

When an authorized person desires to open or close the valve 10, a suitable headed screw driver (not shown) is fitted into the drive socket of the fasteners 117 and the fasteners 117 threadably advanced until the reduced end 124 of the fasteners 117 engages the wrench flats 60 of the yoke 44. This establishes a torque transmitting connection between the bell 72 and the yoke 44 so rotation of the bell 72 rotates the yoke 44 and thereby raises or lowers the valve element 22 and thereby opens or closes the valve 10.

After the valve 10 is placed in either its desired open or closed position, the authorized user then reverses the process and either threadably retracts the fasteners 117 or completely removes them thereby making it difficult or impossible to change the position of the valve 10.

Figure 6:
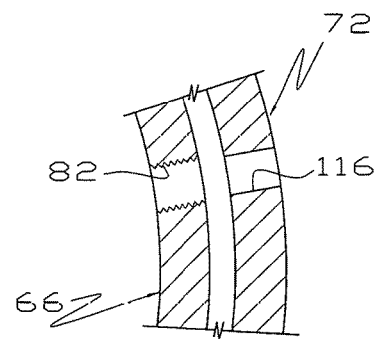
FIG. 6 is a cross-sectional view of the joint between the cover and a support.

A feature, which may be preferred, of the joint between passages 116 in the cover 72 and passages 82 in the support 66 is illustrated in FIG. 6. It may be desirable to limit access to threads in the passages 82 to prevent an unauthorized person from measuring the threads. The passages 116 in the cover 72 simply provide access to the passages 82 so an authorized person may use a suitable wrench to rotate the fasteners 117. By making the passages 116 smaller than the passages 82, one cannot insert a test thread to determine characteristics of threads in the passages 82.

Referring to FIG. 7, a secure valve access assembly 132 includes a cover 134, analogous to the bell or dome 72, which is mounted for rotation about an axis 136 corresponding to the axis of rotation of a valve stem 138 which extends out of a valve housing 140 of a conventional plug or ball valve 142. Typically, seals 144 seal around the exterior of the valve stem 138 in a conventional manner. The valve stem 138 connects to a ball or plug valve element 146 so that rotation of the valve stem 138 by a quarter turn rotates the valve element 146 from a position allowing fluid flow through the valve 142 to a position preventing fluid flow through the valve 142. The valve stem 138 of typical plug or ball valves include a passage 148 normally receiving a pin (not shown) securing a valve wheel (not shown) or valve handle (not shown) to the valve stem 138 for opening and closing the valve 142 in a conventional manner.

The secure access system 132 may include an extension 150 having a wrench section 152 providing an opening 154 for receiving a pin 156 to secure the extension 150 to the valve stem 138. The wrench end 152 provides a hex or wrench section for purposes more fully apparent hereinafter. The extension 150 also includes a threaded end 158 threadably connected to a nut 160 for securing a support 162, analogous to the support 66, to the extension 150.

The support 162 may be of any suitable shape and includes a central passage 164 to receive and pass over the extension 150. The passage 164 is sufficiently large that the support 162 can rotate relative to the extension 150 without transmitting torque to the extension 150. One or more threaded passages 166 align, in an assembled condition of the access system 132, with threaded passages 168 in the cover 134. Fasteners 170 accordingly secure the support 162 to the cover 134. A second set of threaded passages 172 open into the central passage 164 and allow a second set of fasteners 174 to function in the same manner as the fasteners 117. The fasteners 174 accordingly have a drive socket analogous to the drive socket 114 and can be advanced by a suitably shaped wrench into the faces of the wrench end 152 of the extension to transmit torque from the cover 134 to the valve stem 138. It will be seen that the support 162 is analogous to the support 66 in the sense that one set of fasteners 170 connect the support 162 to the cover 134 while a second set of fasteners or elements 174 selectively places the support 162 into torque transmitting connection to the valve stem 138. The fasteners 174 may be selectively retracted to retreat away from the valve stem 138 and thereby break the torque transmitting connection between the cover 134 and the valve stem 138 to prevent an unauthorized party from opening or closing the valve 142. It will be seen that this invention may be use in conjunction with a wide variety of valve types.

In order to space the support 162 relative to the cover 134 so the passages 166, 168 align and/or appropriately position the support 162, one or more shims 176 may be provided. It may be preferred to grease any shims used with secure valve systems to minimize friction and its consequences.

The cover 134 may be similar to the cover 72 although it may include a closed top 178 because the valve stems of typical plug and ball valves do not move up and down. The cover 134 may include handles 180 pivoted to the cover 134 and resting in grooves 182 when not in use.

Figure 8:
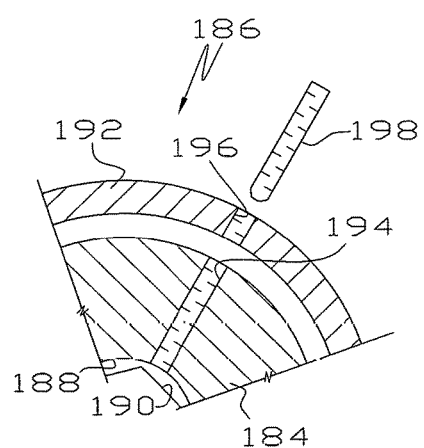
FIG. 8 is a cross-sectional view of another embodiment of this invention.

In the embodiments of FIG. 1-7, there fire two sets of fasteners, i.e. one set continuously connecting the cover and the support and a second set having two positions, i.e. one position where the support is in torque transmitting connection with the valve stem and a second position where it is not. In FIG. 8, these functions are combined in a single type of fastener, although multiple fasteners may be used. Referring to FIG. 8, which is scaled much like FIG. 7, i.e. a support 184 of a secure valve access assembly 186 is radially more extensive and includes a central passage 188 receiving a wrench end 190 of a valve operator, such as the wrench flats 60 of FIG. 2 or the extension 150 of FIG. 7. The support 184 is received inside a cover 192 and threaded passages 194, 196 in the support 184 and cover 192 are aligned. One or more long fasteners 198 extend through the aligned passages 194, 196 and has two functions, i.e. it continuously joins the cover 192 and the support 184 and it selectively places the support 184 and cover 192 into torque transmitting relation with the wrench end 190. The fastener 198 may have an unusual drive socket, of which FIG. 4 is exemplary. Operation of the secure valve access assembly 186 is the same as the embodiments of FIGS. 2 and 7. When the fastener 198 is in its innermost position, torque may be transmitted from the cover 192 to the valve stem wrench end 190. When the fastener 198 is retracted slightly, the support 184 can rotate relative to the valve stem wrench end 190. It may be preferred that the fasteners 84, 117, 170 be hardened steel or similar material which cannot readily be drilled or tapped.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the appended claims.

I claim:

1. A secure valve access assembly for a valve having a valve element inside a valve housing, the valve element being movable between one position allowing fluid flow through the valve and another position preventing fluid flow through the valve, the valve element being connected to an exteriorly threaded valve stem extending out of the valve housing, a yoke threadably receiving the valve stem, the yoke being rotatable to raise and lower the valve stem, an annular support surface perpendicular to and surrounding the valve stem at a location between a top of the valve stem and the valve element, the assembly comprising;
   an annular support member configured to be received over and surrounding the valve stem and configured to be supported on the annular support surface, the valve stem being configured to pass through the annular support member;
   a connector configured to secure the annular support member to the yoke and comprising at least one fastener extending perpendicularly to the valve stem and having a path of fastening movement perpendicular to the valve stem; and
   a cover configured to be mounted over the valve stem, connector and annular support member, the cover including
      a first element configured to releasably connect the cover and the annular support member thereby preventing movement of the cover away from the annular support member, and
      a second element configured to provide a first position extending through the cover, abutting the yoke and configured to transmit torque between the cover and the yoke for rotating the yoke in response to rotation of the cover, the second element having a second position out of the torque transmitting engagement with the yoke thereby allowing rotation between the cover and the yoke.

2. The secure valve access assembly of claim 1 further comprising a thread protector comprising an elongated metal tube, at least partially inside the cover, having an open end configured to receive the valve stem and a closed end.

3. The secure valve access assembly of claim 2 wherein the cover provides a central opening configured to receive the closed end of the thread protector.

4. The secure valve access assembly of claim 3 wherein the thread protector includes a grease zert exposed outside of the cover.

5. The secure valve access assembly of claim 3 wherein the cover is tapered and has a large end adjacent the annular support member.

6. The secure valve access assembly of claim 1 wherein the annular support member is configured to wholly transmit weight of the cover to the yoke.

7. The secure valve access assembly of claim 1 wherein the cover is configured to be supported directly on a bonnet of the valve.

8. The secure valve access assembly of claim 1 further comprising handles pivotally connected to the cover for rotating the cover.

9. The secure valve access assembly of claim 1 wherein the first element is a threaded fastener securing the cover to the annular support member.

10. The secure valve access assembly of claim 1 wherein the second element is a threaded fastener, the second element in the first position extending through the cover and configured to jam against the yoke, the second element in the second position being at a location spaced from the yoke.

11. The secure valve access assembly of claim 1 wherein the first and second elements are joined together.

12. The secure valve access assembly of claim 1 wherein the yoke includes an upper end and the annular support surface, the annular support surface being between the upper end and the valve housing.

13. The secure valve access assembly of claim 1 wherein the annular support member comprises a plate having an opening therein configured to receive an upstanding part of the yoke.

14. A secure valve access assembly for a valve having a valve element inside a valve housing, the valve element being movable between one position allowing fluid flow through the valve and another position preventing fluid flow through the valve, the valve element being connected to a valve stem extending out of the valve housing, the valve stem being rotatable to move the valve element between flow allowing and flow preventing positions, the assembly comprising:
   an annular support member configured to be received over and surrounding the valve stem and being configured to be supported on the valve stem, the valve stem being configured to pass through the annular support member;
   an extension configured to be received on the valve stem and configured to secure the annular support member to the valve stem the extension comprising at least one first fastener configured to secure the extension to the valve stem and at least one second fastener configured to secure the annular support member to the extension; and
   a cover configured to be mounted over the valve stem, extension and annular support member, the cover including
      a first element configured to releasably connecting the cover and the annular support member thereby preventing movement of the cover away from the annular support member and
      a second element having
         a first position configured to connect the cover and the annular support member, the second element being configured in the first position to transmit torque between the cover and the annular support member for rotating the annular support member and thereby rotating the valve element in response to rotation of the cover,
         the second element having a second position disconnecting the cover and the annular support member allowing rotation between the cover and the annular support member and thereby allowing the cover to rotate relative to the valve stem.

15. The secure valve access assembly of claim 14 wherein the valve element is a ball or plug and wherein the extension includes a wrench section configured to abut the second element in the first position thereof, the second element being configured in the first position to apply torque to the wrench section.

16. The secure valve access assembly of claim 14 wherein the first element is a threaded fastener securing the cover to the annular support member.

17. The secure valve access assembly of claim 14 wherein the second element is a threaded fastener, the second element in the first position being configured to abut the extension and transmit torque from the cover to the valve stem, the second element in the second position at a location spaced from the extension and allowing rotation between the cover and the valve stem.

18. The secure valve access assembly of claim 14 wherein the first and second elements are joined together.

* * * * *